May 4, 1943.     C. F. W. FORSSBERG     2,317,988
REVERSIBLE OPTICAL SYSTEM
Filed Nov. 22, 1940     4 Sheets-Sheet 1
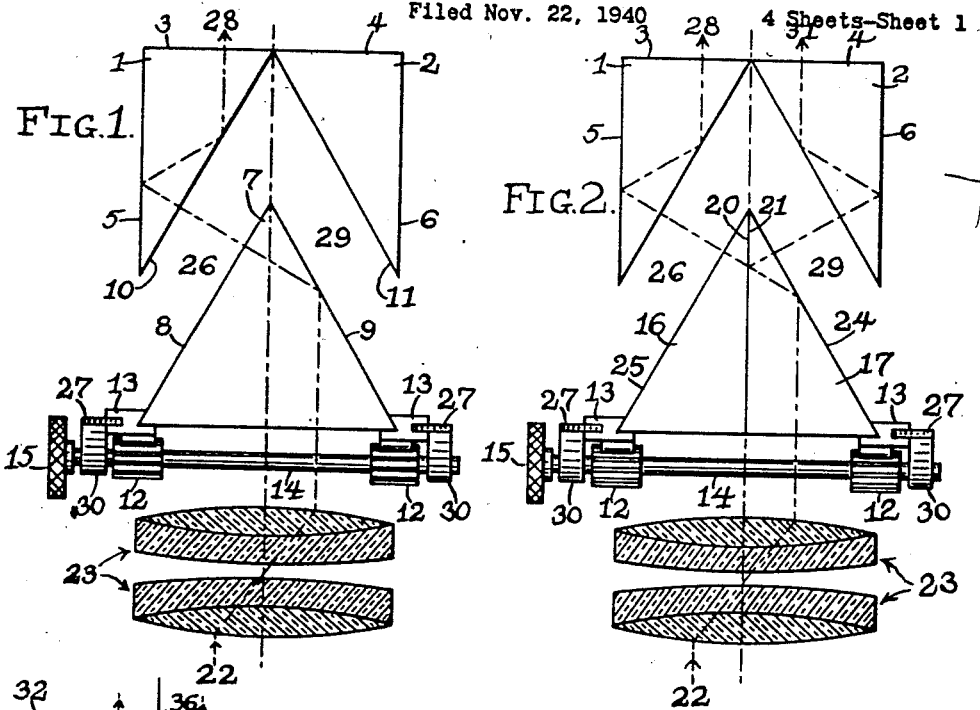
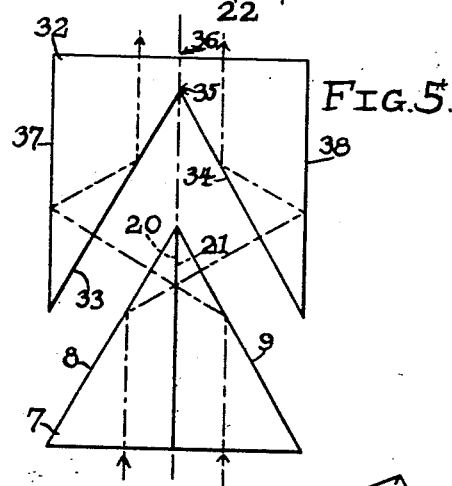
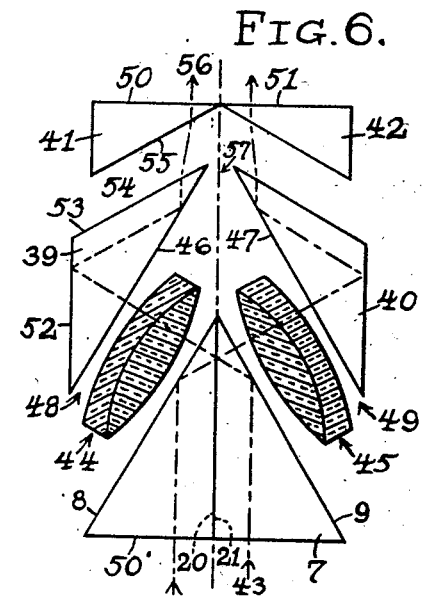
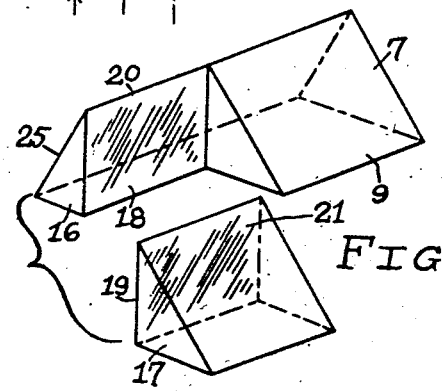
INVENTOR
Carl F. Wm. Forssberg

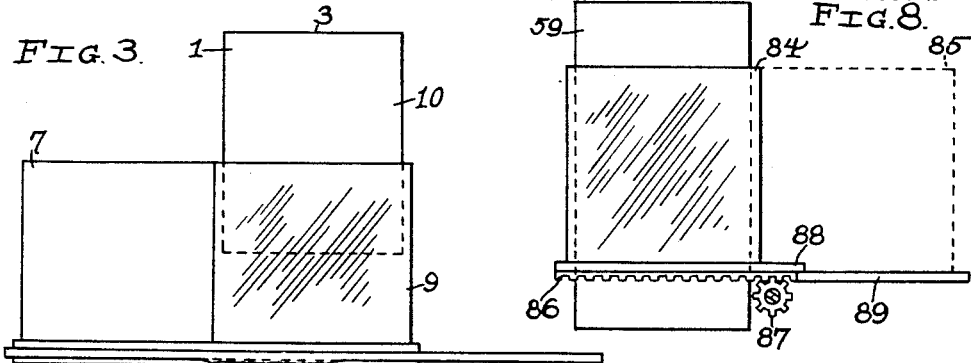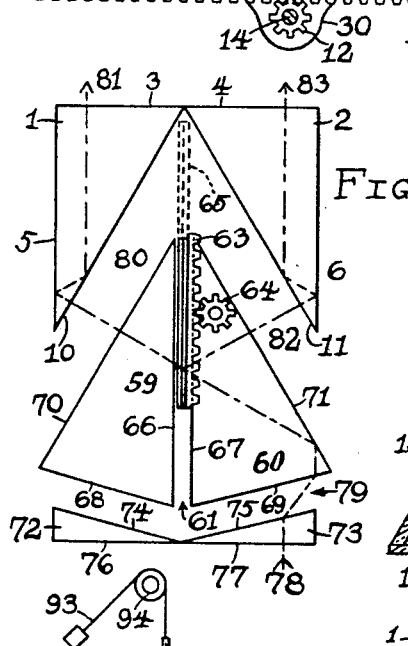

May 4, 1943.  C. F. W. FORSSBERG  2,317,988
REVERSIBLE OPTICAL SYSTEM
Filed Nov. 22, 1940   4 Sheets-Sheet 3

INVENTOR
Carl F. Wm. Forssberg

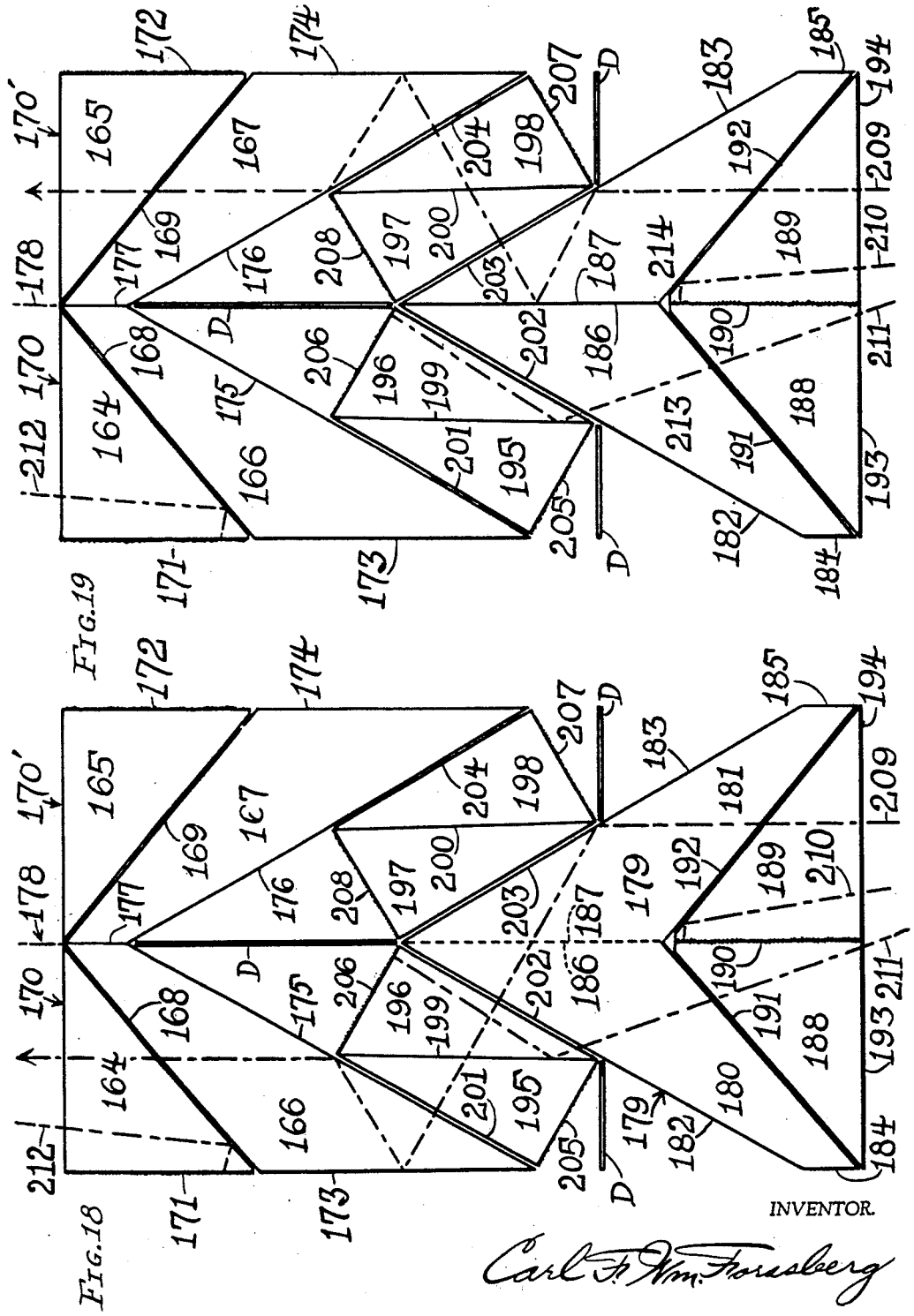

Patented May 4, 1943

2,317,988

UNITED STATES PATENT OFFICE 2,317,988

REVERSIBLE OPTICAL SYSTEM

Carl F. W. Forssberg, Brooklyn, N. Y.

Application November 22, 1940, Serial No. 366,790

22 Claims. (Cl. 88—1)

This invention relates to a reversible or alterable optical system for photographic work, for projection of images, and for other purposes, wherein it is desirable to have facilities at hand for viewing, photographing, or projecting objects in normal position and optionally in reversed or shifted positions.

This application is a continuation in part of my copending application Serial No. 156,397, filed July 29, 1937.

The main object of my invention is to provide an optical system of the character indicated, by which it is possible to present an optical image in normal position or in reversed or shifted position at will, and also be capable of again reversing, shifting or restoring the object viewed, photographed, or projected in convenient manner.

Another object is to have a reversible or alterable optical system in which the optical distances are theoretically the same in direct normal and also in reversed shifted positions of adjustment.

It is also an object of my invention to have an optical system of this class which, when combined with appropriate objective lenses, will be capable of enlarging, reducing, or reproducing an optical image either in reversed, shifted or normal position without the necessity of moving or adjusting more than one reflecting member in order to produce the reversal or shift or restore the image to normal position.

A further object is to provide an optical system in which parasitic reflections and so-called ghost images are eliminated, and which is entirely practical withal.

Other objects, and the various advantages inherent in the construction and practical application of my invention will appear more fully in detail as this specification proceeds.

In photography and in optical viewing instruments, binoculars, range finders, and projection apparatus, it is frequently desirable to be capable of reversing an optical image from normal position so that the right side of the image is turned to the left, and vice versa, and even occasionally to invert the image involved. This type of optical system is also useful in connection with lenticulated films when a color filter is arranged within the objective or at least is associated with said objective or a camera when the system is used for taking, copying or printing pictures.

The invention is particularly an improvement over former optical reversing systems in being reversible at will without shifting the entire system into or out of range of the normal path of the light rays of the apparatus involved, and also without in the slightest degree altering the optical distances involved, so that the focus obtained in normal position of adjustment of the system will be undisturbed and remain exactly the same even in reversed adjustment of the system.

The optical reversing system disclosed in Patent #2,009,816 dated July 30, 1935, of Räntsch and Ewald, which is also disclosed in British patent of Dyer, #20,771 of 1913, particularly in Figs. 21 and 21a, involves the use of an equilateral prism and two rectangular prisms spaced from said first prism and having two sides spaced on both sides of the apex of said equilateral prism in parallelism with the sides of said latter prism which meet in the apex, the base of this prism being transverse to the axis of the system.

In the present invention, certain of the doctrines taught in said British patent, for example, in Figs. 20c and 20d, as well as in previously mentioned Figs. 21 and 21a, and also in Figs. 29, 32, 33, 34, 40 and 40a, etc., are now adopted in part, and hence, the equilateral prism may in the present invention be replaced by two or more symmetrically opposed prisms with the addition of certain other features, or even by a system.

However, referring now particularly to the accompanying drawings, showing several practical modifications of my invention, Fig. 1 is a section through an optical system made according to my invention, and embodying certain features and advantages thereof.

Fig. 2 is a similar section to that of Fig. 1, with a portion of the optical system in altered position.

Fig. 3 is a side view of the same system with one of the prisms removed to better disclose the construction of the main prism of my optical system.

Fig. 4 is a perspective view of the said main prism with a portion removed to illustrate more fully the construction of the main prism.

Fig. 5 is a section of a modified form of my invention, wherein certain prisms are combined, or at least modified in form.

Fig. 6 is a modification of the optical system of Figs. 1, 2 and 3, wherein two of the prisms are replaced by a prism system while the main prism is the same.

Fig. 7 is a section of another modification of the invention, wherein two of the prisms are used as in the first three figures, but the main prism is entirely replaced by a system of prisms.

Fig. 8 is a side view of two of the prisms of a similar system to that of Fig. 7, including a further modification.

Fig. 9 is a partial view of certain prisms of Fig. 7, illustrating in section a housing or tank for receiving a reflecting member, such as a mirror in a liquid disposed between said prisms.

Fig. 10 is a sectional view of a modification of the structure of Fig. 8 with the near prism removed to disclose construction details.

Fig. 11 shows in section a modification wherein the main prism of Figs. 1 to 4 is replaced by a different prism system than in Fig. 7.

Fig. 17 is a modification utilizing a liquid cell or prism with a mirror which may be immersed in or raised from the liquid in said cell.

Fig. 18 is a diagrammatic elevation of a practical form of the invention in which the prisms are closely associated and parasitic reflections completely eliminated.

Fig. 19 is another view of the same in which a reversed operative condition of the system is present.

Throughout the views, the same reference numerals indicate the same or corresponding parts.

Figure 12:
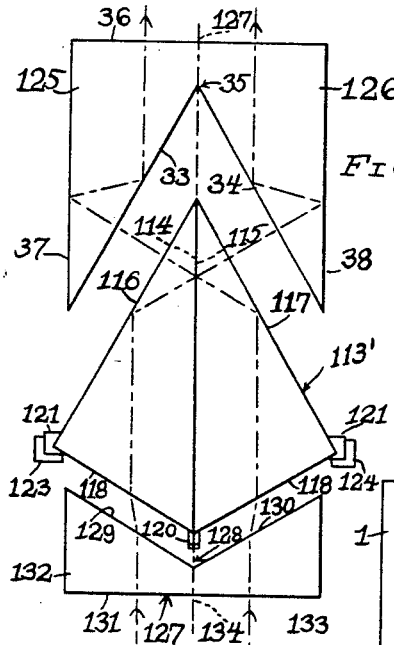
Fig. 12 is a sectional view of a similar system wherein the outer prisms are either modified in form or consolidated.

In the practice of my invention, a pair of rectangular prisms 1 and 2 of glass or of that material known as "Lucite" which is a methyl methacrylate resin, or other transparent bodies, are disposed mutually in proximity with their upper ends or bases 3 and 4 in line, and their outer sides 5 and 6 substantially in parallelism with each other. An equilateral prism 7 is disposed with its sides 8 and 9 in spaced parallelism with the inner sides 10 and 11 of the rectangular prisms which form the hypothenuses thereof. This prism is preferably movable by means of a pair of pinions 12, 12 engaging with a pair of racks 13, 13 from one extreme position to the other, wherein entirely different portions of said prism are disposed adjacent to prisms 1 and 2. Pinions 12, 12 are mounted upon a shaft 14 which may be rotated by means of a knob or hand wheel 15.

The mentioned prism 7 is mainly composed of a solid prism portion extending along approximately one-half of the length of the entire prism, while the remaining one-half is split and formed of two rectangular prisms 16 and 17, which have the corresponding inner vertical sides 18 and 19 provided with reflecting mirror coatings 20 and 21, respectively. The prism 17 may, with prism 16, be cemented to the end of prism 7 and also mutually cemented together so that the outer surfaces of the prisms lie in substantially the same planes with the result that this composite prism exteriorly presents but three main surfaces, that is, the two sides and base, not to mention the sheer ends.

Of course, it is quite obvious that prisms 16 and 17 may extend the entire length of the composite prism 7 and said prism 7 may thus be split along its whole length with only the length of each rectangular prism 16 and 17 provided upon their meeting surfaces with mirror coatings, while the remaining portions of said surfaces may remain clear. If the prism portions thus partly clear and partly provided with reflecting coatings, are cemented together, it is quite obvious that the adjacent cemented glass surfaces will transmit light entirely without interruption, while the reflecting coating will serve as a vertical central mirror within each prism. It would appear that this modification is so obvious as hardly to require illustration.

Referring now specifically to Fig. 1, it will be noted that when a light ray passes toward prism 7 from the point indicated at 22 optionally through objective lenses generally indicated at 23, this ray will pass upwardly into prism 7 and be reflected from the side 9 toward side 8 and through the gap 26 between said side and the inner side 10 of prism 1, and through the same toward the outer side 5 thereof, which is preferably provided with a reflecting mirror coating from which said light ray is reflected upwardly toward inner side 10 of said prism 1 and thence said light ray will be reflected through the upper end or surface 3 of said prism as indicated at 28.

If the hand wheel 15 is manipulated so that pinions 12, 12 exert traction on racks 13, 13 and cause the same to travel upon guides 27, 27 which may be provided with bearings 30, 30 for the pinion shaft 14, and thereby the transparent portion of prism 7 is moved out of range so that prisms 16 and 17 register with prisms 1 and 2, the same ray of light should again travel upwardly from 22 through the objective lenses indicated at 23, into the prism 17; the light will be reflected within the prism from the upper surface 24 toward the central mirror surface or coating 21 from which it will be reflected perpendicularly with respect to said surface 24 of the same prism, and through the gap 29 into the prism 2 through the inner surface 11 thereof, to its outer side 6. This outer side 6 is preferably also provided with a reflecting mirrror coating from which the light ray will be reflected toward surface 11 and thence upwardly out through the upper surface or end 4 of prism 2 as indicated at 31. If the light ray should pass upwardly from the other side into prism 16 against surface 25, it would naturally be reflected by surface 20 and would pass finally up through end or base 3 at 28 as though said ray had started from the other side as in Fig. 1.

From the foregoing discussion it is evident that movement of prism 7 through prisms 1, 4 in longitudinal direction from one extreme position to another will reverse whatever image is passed or projected through objective lenses 23 or, in face, through the prism system, the image being erect in one position of adjustment and reversed in the other position of adjustment of said prism 7. The actual change which occurs is simply that the reflecting coatings 20 and 21 either are exposed in the optical field or withdrawn from said field, and in view of their trifling thickness the optical paths of the rays of light in either case is substantially the same when the image is reversed or directly projected in erect condition.

In Fig. 5 a modification is shown, wherein the two rectangular prisms, Figs. 1 and 2, are replaced by a consolidated prism 32, having interior surfaces 33 and 34 corresponding with inner surfaces 10 and 11 of prisms 1 and 2 and terminating at the highest point 35 where they meet. The upper surface 36, which forms the top of the prism generally corresponding with the upper surfaces 3 and 4 of prisms 1 and 2, is spaced above the point 35 by a thickness of transparent material of which the prism 32 is composed. The sides 37 and 38 which correspond to reversed sides 5 and 6 of Figs. 1 through 4, are preferably provided with a reversed mirror coating upon each. Of course, prism 32 can well be made up of two halves which merely meet at a mutual vertical junction rather than extending from points 35 upwardly to surface 36, or two similar prisms may be cemented together at this center portion. The main advantage of this form is that sharp and very acute angles are done away with so that the grinding or shaping of the prisms is facilitated, although the operation of the system of Fig. 5 is exactly the same as in Figs 1 to 4, except that the uppermost portion upon surface 36 is a little higher than surfaces 3 and 4 in Figs. 1 and 2, for example.

In Fig. 6 a modification of the form of the system shown in Figs. 1, 2 and 3 is illustrated, wherein the two prisms 1 and 2 are replaced by a prism system including spaced prisms 39 and 40 and upper prisms 41 and 42, for a purpose which will be immediately set forth. While in the first figures the lenses generally indicated at 23, have been shown as disposed below prism 7 or at one end of the prism portion of the system, it is sometimes found expedient to introduce the lenses at the sides of the main prism 7 as indicated at 44 and 45 because there is a considerable gap between the sides 8 and 9 of the said prism and the inner sides 46 and 47 of prisms 39 and 40 as shown at 48 and 49. By placing the lenses in these gaps which actually form waste spaces, an economy of spacing as well as reduction of the actual length of the optical path through the light system will result, so that said system will be more compact. When lenses are thus inserted into the gaps of spaces 48 and 49 it is, nevertheless, desirable for some purposes to alter the length of the light path from the base 50 of prism 7 up to the lenses 44, for example, with respect to the length of the light path from surface 46 of prism 39 up to the surface 50 of prism 41, the said surface 50 of said prism being, of course, contiguous to and in line with the upper surface 51 of prism 42.

If we now follow a ray of light starting at 43 and entering prism 7 through the bottom or base 50', said ray will be reflected from surface 9 over toward the left so as to cross the axis of the system, the ray then passing perpendicularly through surface 8 of prism 7 and through lenses 44 into prism 39 through its inner surface 46. The light ray is then reflected toward the right from the preferably silvered side 52 of prism 39 toward inner surface 46, from which the ray is reflected directly upward in parallelism with the axis of the system until it strikes the inclined surface 53 of said prism. Upon leaving prism 39 through inclined surface 53, the light ray will be refracted toward the right through gap 54 until said ray strikes the inclined inner or lower surface 55 of prism 41 which is parallel with surface 53 of prism 39, when the direction of the light ray will be restored to parallelism with the axis of the system within prism 41, said ray continuing up and out through the upper surface 50 of said prism 41 as indicated at 56. The ray of light which may enter the lower surface 50' of prism 7 to the left of the axis, will of course, pass through lenses 45, and prism 40, as well as prism 42 in a manner which is quite analogous to the path of the light as just described in connection with prisms 7, 39 and 41. The other office of prisms 41 and 42 is to split apart the light which may enter said prisms and then pass down through the system, or to converge the light coming from below from prism 7 so that the light rays will be properly brought together from the sides to form a complete view when viewed or projected upwardly to and through prisms 41 and 42, and thus there is a distinct gap 57 between prisms 39, 40.

As has already been stated, the light path can be lengthened on either side of each gap 48 or 49, or rather on either side of lenses 44 and 45 by introducing prism systems above the same or below the same. The Fig. 6 just described shows the manner in which the light path from lenses 44 may be lengthened upwardly while the light path below said lenses is unaltered. In the following figures it will be shown how the structure of Fig. 6 can be replaced by a system which will lengthen the light path below lenses 44 and 45, or if no lenses are used, at that point down below the gaps similar to 48 and 49 between the prisms. It should also be pointed out that by utilizing this method of altering the length of the upper or lower portions of the light path passing through the optical system will serve to balance the light in certain optical operations in various types of optical apparatus and will solve some problems of focus and the like, by making the entire system more flexible and capable of varied adjustments which are hardly possible with an optical system having only two or three prisms.

Hence, Fig. 7 illustrates a modification wherein the prism 7 of Figs. 1 to 6 is replaced by a prism system including prisms 59, 60, 72 and 73, the prisms 59 and 60 being spaced apart as was true in Fig. 6 of prisms 39 and 40, although they are of different shape than said last mentioned prisms. While in the previous figures prism 7 was bodily movable and was formed at one end into a split prism having mirror surfaces or coatings applied to the central meeting surfaces within the prism, in the present modification the mirror coatings are applied to thin glass or other transparent sheets of material so as to be movable as a unit into or out of the optical field, while the prisms remain fixed. The rectangular prisms 1 and 2 may be exactly the same as in Figs. 1 and 2 in respect to each feature thereof, but the composite or built up prism 7 is completely replaced by two opposite spaced and symmetrical prisms 59 and 60 which are spaced apart along the optical axis of the system so as to provide a gap indicated at 61. This gap is intended to be just sufficient to provide clearance for a movable mirror 62 which may be moved by means such as a rack 63 secured to said mirror, and a pinion 64 into a raised position indicated at 65, or into a lowered position in which said mirror is completely interposed between the opposed parallel surfaces 66 and 67 of prisms 59 and 60. In order to provide the mentioned clearance gap certain expedients are resorted to which will be immediately explained.

The lower surfaces 68 and 69 of said prisms 59 and 60, respectively, are downwardly inclined toward the axis of the optical system, while the outer surfaces 70 and 71 are disposed in spaced parallelism with respect to inner surfaces 10, 11 of prisms 1 and 2. Base prisms 72 and 73 are disposed in spaced relation with respect to prisms 59 and 60 and provided with upper inclined sides 74 and 75 which are parallel with lower sides 68 and 69 of prisms 59 and 60, while the lower surfaces or base portions 56 and 57 of prisms 72 and 73 substantially parallel with the upper ends or surfaces 3 and 4 of prisms 1 and 2, and perpendicular to the axis of the system. If a ray of light is now followed through the system disclosed in Fig. 7, commencing at 78 and passing upwardly through the base prism and through the base or lower surface 77 of prism 73, said ray of light upon encountering the surface 71 and the air gap 79 will be bent toward the right and away from the axis of the system and when encountering the lower surface 69 of prism 71 will again be brought into parallelism with said axis and said ray encountering the outer side 71 of said prism, at which point the ray will be reflected toward surface 67 of said prism 60. If the central mirror 62 is in raised position so that it does not occupy the gap 61 and thus does not intercept the light ray, said ray will cross the gap 61 and enter prism 59 and pass out through side 70 thereof, across the gap 80 and through surface 10 of prism 1 toward the reflecting side 5, when said light ray will be reflected back at an angle to the side 10 whence it will be reflected upwardly out through the end or base surface 3 as indicated at 81.

If the mirror 62 is lowered between prisms 59 and 60 so that it intercepts the light ray as it approaches surface 67 of prism 60 and is about to cross the gap 61, the said light ray will be reflected back toward side 71 of prism 60 at right angles to said side so that said ray will issue from said side into gap 82 which it will cross so as to enter prism 2 through side 11 after which it will meet reflecting side 6 of said prism. Said reflecting surface 6 will then reflect the ray at an angle toward side 11 whence the ray will be reflected upwardly through the end or surface 4 of prism 2 so as to issue therefrom as indicated at 83.

It will be evident that upon spacing the base prisms 72 and 73 at a distance from the lower surfaces of prisms 59 and 60 simultaneously, with the feature of inclining said surfaces so as to present different angles, then the right angles with respect to the axis of the system will serve to diverge the light toward the right or toward the left of the center or axis so as to produce an idle space along said axis which may be usefully occupied by a mirror as already explained, and in fact this construction compensates for the space occupied by said mirror so that said mirror will not distort or remove any effective portion of the optical field by its presence.

In Fig. 8, a side view of the prisms 59 and 60 is given, while a mirror 84 is illustrated as movable in horizontal direction toward a position indicated at 85, instead of vertically along the axis as in Fig. 6. A rack 86 beneath said mirror and a pinion 87 may be used to shift said mirror, while a support or guide similar to 88, upon the mirror or associated with the rack 86 may be slidable upon a rail similar to 89 serving to support the mirror on the same with the latter reflecting in all positions thereof. The mirror is thus movable from the position indicated in full lines, at will, to that already mentioned as represented in broken lines at 85, and vice versa.

In Fig. 9 the two prisms 59 and 60 are shown in modified form at 90 and 91, while a mirror 92 may be raised and lowered between said prisms by means of a cord or chain 93 operating over a pulley or roller 94. A strip 95 of metal or resin such as "Lucite," etc., or other suitable material, is disposed beneath the gap 96 between the prisms and is bent up at the ends as indicated at 97, so that said strip forms with the inner sides 98 and 99 of prisms 90 and 91, a trough capable of holding a liquid. Various known expedients may be resorted to in order to make the resulting trough liquid tight, as by using gaskets or by cementing, screwing or fastening said strip to the prisms in suitable manner. A cement such as glycerine with litharge or rubber or even certain kinds of putty or white lead may be used. If then, any liquid of corresponding or contrasting index of refraction with respect to the index of the material of which the prisms 90 and 91 are composed, is then poured into said trough indicated at 100, a self-healing optical joint will be formed between prisms 90 and 91. Suitable liquids may be of the type of glycerine, glycerole, glycol, alcohol, brine, carbon disulphide, oils, etc., so long as the index of refraction of said liquid bears a predetermined relation to that of the material of the prisms. For example, if the prisms are composed of crown glass or of that material known as "Lucite," the index of refraction is approximately 1.52 more or less, and this corresponds tolerably with the index of refraction of common glycerine which can logically be used in the trough. If the prisms are composed of flint glass or of a denser form of "Lucite" or resin, the liquid carbon disulphide or the like, may be indicated as the proper liquid to occupy the trough as the index of refraction is from 10 to 15 hundredths higher than that of crown glass and glycerine, but other corresponding prism materials and liquids may of course, be used within the scope of my invention, and I do not limit myself to these materials or liquids but merely cite these as examples to guide in the selection of any properly balanced and matched liquids and prism materials.

The effect of the liquid in the trough is that when the mirror is raised out of range, the two prisms in the liquid interposed between the same in said trough, will optically operate as a solid prism of a single uniform material without any refraction or reflection either in the slightest degree occurring at the surfaces 98 and 99. When the mirror 92 is lowered into the liquid the glass or other material of said mirror, if the mirror consists of transparent material provided with reflecting surfaces, will become wet by the glycerine or other liquid 100 in the trough so that the surface of the mirror if of glass will not tend to reflect light rays, but instead the material of the mirror will optically merge with the glycerine and the material of the prism 91 for example, so that the only reflection that will occur will be directly from the reflecting surfaces or coatings of the mirror. Of course, the mirror may, if desired, consist of two relatively thin glass mirrors or the like, which are coated upon their inner surfaces with reflecting silver or mercury coatings so that said mirror is actually double and capable of reflecting from both sides. This condition is of course, true with respect to mirror 62 shown in connection with Fig. 6 but also a thin sheet of metal coated with or consisting of a highly reflecting metal may be used if properly polished, so that glass or the like may be dispensed with. The principle remains the same in both cases so that reflection takes place from both sides of the mirror, while the mirror may be raised from or lowered into the liquid between prisms 90 and 91 so as to be interposed in the optical field and cause reflection from the reflecting surfaces or portions thereof, and when raised from said liquid or the like and out of range of the optical field, will allow the liquid instantly to run together and optically heal the ray path and optical joint between the prisms 90 and 91.

In Fig. 10 a modification of Fig. 9 is shown, wherein the trough 101 has a liquid 102, while the bottom 103 with the ends 104 and 105 of the trough may be of metal or other suitable material, only one of the prisms, namely, 90 being shown inasmuch as the view is a section along the plane corresponding with the axis of the system. However, in this case the trough is lengthened so that the sides, similar to 106, project beyond the rear end 107 of prism 90 and other corresponding prisms, while the mirror 108 is slidable from the position indicated in full lines, in which it is out of optical range in idle position, into the other extreme position in said trough, wherein it is interposed between the prisms and conceals the side 98 of prism 90. An example of means for moving or sliding said mirror into and out of range at will, is illustrated by a pair of rollers or pulleys 109 and 110, over which a cord or chain 111 is adapted to run, which is connected intermediate the ends thereof to the mirror at 112. Pulling upon the cord or chain at one end will, of course, draw the mirror in that direction. Pulling the cord at the other end will return the mirror to the extreme position in the other direction.

In Fig. 11 the prisms 1 and 2 of the first figures are used in the same relations with respect to each other as in said figures, while the prism 7 is replaced by a prism 113 which has two features in common with prism 7, namely that through half its length the prism is split and provided in the split portion with interior mirror coatings indicated at 114 and 115, and that the sides 116 and 117 are spaced in parallelism with respect to inner sides 10 and 11 of the prisms 1 and 2. Below this prism 113 are a pair of prisms 72' and 73' which may be the same as, or very similar to, prisms 72 and 73 of Fig. 7, for example, inasmuch as they have the same function, namely, to separate or diverge the light rays to the left and to the right of the optical axis of the system as a whole, while the lower surfaces 118 and 119 of prism 113 are spaced from the upper surfaces 74' and 75' of prisms 72' and 73' in parallelism therewith. The lower surfaces 76' and 77' of said prisms 72' and 73' are, of course, contiguous and in line as before, so as to be parallel with the upper surfaces or ends 3 and 4 of prisms 1 and 2 which are also mutually contiguous. As a result of such divergence of the light to both sides of the optical axis, there is of course, a central idle section running up through prism 113 in a plane coinciding with said axis and with mirror coatings 114 and 115, so that a rack 120 can then be secured to the lowest edge of the prism 113 at the junction of lower surfaces 118 and 119, while a pinion (not shown) meshing with said rack, may be used to shift said prism longitudinally so that either the clear portion of the split half thereof containing the mirror coating will be brought into range of the optical field between prisms 1, 2, 72' and 73'. A pair of projecting rails 121 and 122 may be secured to the outer edges of the prisms and slidably supported in a pair of stationary rails 123 and 124 for example, so that the prisms will occupy accurate positions when shifted from one extreme position to the other through rack 120.

It is obvious that the rack occupies the position of the intermediate idle space produced by the right and left divergence of the light rays by prisms 72' and 73' as indicated by both broken lines spaced at both sides from said rack.

In Fig. 12 the prisms 1 and 2 are replaced by the same or a similar optical prism 32 illustrated in Fig. 5, which may either be a single prism having the profile illustrated in said Figure 12, or may actually consist of two prisms 125 and 126 cemented or fused together along the median line 127 so that the optical operation will be the same in either case. The outer parallel surfaces 37 and 38 are preferably coated with mirror coatings as already described in connection with Fig. 5, while the inner apex at 35 forming the junction of the inner surfaces 33 and 34 is as sharp as possible in order that the reflecting properties of said inner surfaces shall be perfect up to the median line 127.

However, below the composite prism 32 is disposed a movable prism 113 which may be exactly the same in size, form, and characteristics as prism 113 of Fig. 11, while the appurtenances and other features thereof, may also be the same. The prisms 72 and 73 of Fig. 11 are in the present figure replaced by a composite prism 127 which may be a single solid prism of the profile shown, wherein the lowest point 128 at which the upper surfaces 129 and 130 meet, is spaced above the bottom surface 131 of said prism. This prism may, of course, consist of two prisms 132 and 133 cemented or fused together along the median line 134 if desired, since the optical operation will be the same whether the prism is originally integral or made of two fused or cemented prisms.

Figure 13:
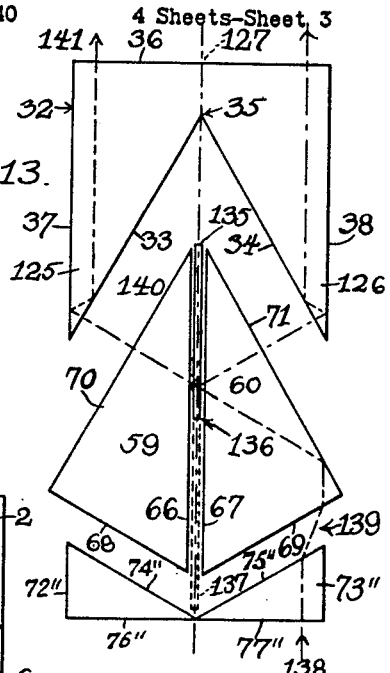
Fig. 13 is a modification of the system of Fig. 7.

Fig. 13 illustrates a modification in which the same or similar composite prism 32 is used as in Figs. 5 and 12, while the remaining portion of the system is similar to the system of Fig. 7. In fact, the optical system of Fig. 7 is merely modified according to Fig. 13 by replacing prisms 1 and 2 by the composite prism 32 of Figs. 5 and 12. In this form of the system it is proposed to move a mirror 135 downwardly instead of upwardly as in the case of mirror 62 in Fig. 7, the mirror extending down to a point indicated at 136 in order to correspond with the entire optical field while being capable of being lowered below said point 136 to a position indicated in broken lines at 137. The mirror may be provided with a rack or may be lowered upon cables or by any known means, as such means per se do not form the essentials of the invention at bar. As a ray of light passes upwardly as indicated at 138 thru prism 73, and crosses gap 139 between the upper surface of 75 and the lower surface 69 of the prisms 73 and 60, the ray entering prism 60 will be reflected from surface 71 toward the left past point 136 to the lowest part of the surface 33, across gap 140 and will then be reflected from reflecting surface 37 back to surface 33 and then upwardly and out through the upper surface of the composite prism 37 at 141. If the mirror is in the lowest idle position the light ray will travel as just described, but if the mirror is in raised position, as indicated at 135 all the light rays passing upwardly from prisms 72 and 73 will be intercepted by the mirror and reflected back again to their respective sides of prisms 59 and 60, and thus upwardly upon the same sides of the optical axis so as to issue thru the top 36 of composite prism 32.

Figure 14:
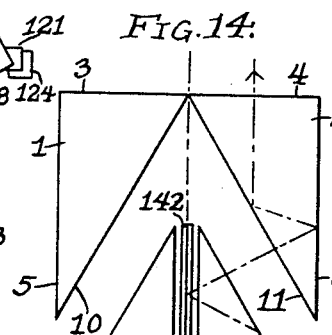
Fig. 14 is a further modification of the same.

Fig. 14 illustrates the modification of the system wherein prisms 1 and 2 as well as prisms 39 and 60 are used as in Fig. 7, for example, while the lower prisms 72 and 73 of Fig. 7 are replaced by the same composite prism or one similar thereto, as by 127 in Fig. 12, while a mirror 142 is disposed between prisms 59 and 60 and is intended to be used out of range from the position shown, by any conventional means in similar manner to any of the previously described mirrors of Figs. 7, 8, or 10. In all practical respects the operation is as in Figs. 6 and 7 except that the optical path is increased by the distance between point 128 and the lowest surface 131 of the prism 127.

Figure 15:
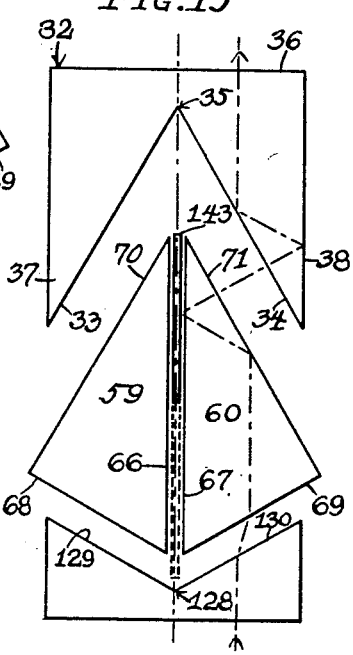
Fig. 15 is a modification in which certain features of Figs. 13 and 14 are combined.

In Fig. 15 the upper composite prism 32 of Figs. 5, 12 and 13 is used together with the lower composite prism 127 and the spaced intermediate prisms 59 and 60 of Figs. 7, 13 and 14, while a mirror 143 is located between the intermediate spaced prisms 59 and 60. Said mirror may either be formed of a pair of relatively thin sheets of glass which are interiorly provided upon their contiguous surfaces with mirror coatings or may consist of a single plate of rather stiff metal such as aluminum, silver, chromium, or the like, or any metal whatsoever plated with these metals and polished. The mirror is, of course, movable into or out of the optical field, and details of this feature are not disclosed in Fig. 15 as having already been made clear. In this form of the system the optical path is increased both above and below by the distance from the top surface 36 to apex 35 added to the distance from the point 128 to the lowest surface 131 in prisms 32 and 127, respectively.

It may be mentioned that in the various modifications wherein composite prisms such as 32 and 127 are used instead of the contiguous prisms 1 and 2 and 72 and 73, respectively, the main purpose served is that when the composite prisms are to be set in position and also to have a part fixed in permanent position, these prisms have structurally sufficient strength by the inherent nature and character of their material so that the various surfaces thereon remain permanently in proper relation to each other. In the forms wherein the separate prisms 1 and 2 as well as 72 and 73 are used, it is obvious that if individual prisms must be accurately lined up with the rest and set in place and individually fixed, it may in some instances be rather troublesome, and it will therefore be preferable in any case to use the composite prism 32 or 127, either or both, to replace either or both of the sets of single prisms when the split additions to the length of the optical path is not objectionable.

Figure 16:
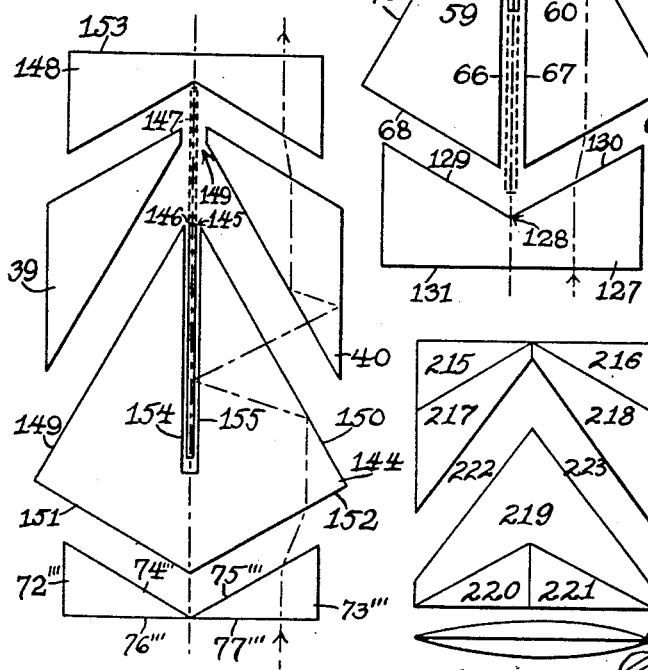
Fig. 16 is also a modification wherein the prisms of Figs. 1 to 4, for example, are all replaced by prism systems.

In Fig. 16 a modification of the whole system is brought to view wherein not only the two prisms 1 and 2 of Figs. 1 and 2, but also the main prism 7 are replaced by prism systems. In other words, the prism system consisting of the prisms 39, 40, 41 and 42 of Fig. 6 are combined with the prism system 59, 60, 72 and 73 of Fig. 7. However, the prisms 59 and 60 are consistently modified in this figure to form a composite prism 144 which is split part of the way through from the upper portion in a plane coinciding with the axis of the optical system as a whole to form a gap 145 into which a mirror 146 may descend or out of which it may be elevated by any known means to a position indicated at 147. The upper prisms 41 and 42 of Fig. 6 are also modified to form a composite prism 148 which may be integral throughout and serves the purpose of diverging the rays of light toward the right and the left of the optical axis so as to provide a gap 149 to accommodate the mirror 146 in its raised position 147. The prisms 39 and 40 also shown in Fig. 6 may, of course, have all the characteristics, features, and actual forms of said prisms in said Fig. 6 so as to operate in the same manner, while prism 148 will operate in relation to said prisms 39 and 40 in the same manner as prisms 41 and 42 in Fig. 6. Of course, prisms 41 and 42 can readily be used instead of composite prism 148, while on the other hand, composite prism 127 can be used in the modification instead of prisms 72 and 73.

The mentioned features regarding the upper and lower prisms may be modified or interchanged according to the features already disclosed in the foregoing figures, but the intermediate prism 144 has the outer upper surfaces 149 and 150 spaced from and parallel with the inner surfaces 46 and 47 of prisms 39 and 40, while the lower surfaces 151 and 152 are spaced from and parallel with the upper surfaces 74 and 75 of prisms 72 and 73. The lower contiguous surfaces 76 and 77 of these prisms are, of course, parallel with the top surface 153 of the prism 148. The main advantages of the present modification are that prism 144, by virtue of its being in great part solid will retain all its optical surfaces in permanent proper relation, while a proper space is allowed within said prism for the mirror 146 and clearance is also created above the same by virtue of the spacing apart of prisms 39 and 40 so as to allow said mirror to be raised completely out of the optical field between the inner surfaces 154 and 155 of gap 145 in prism 144.

Another form of prism is shown in Fig. 17 which may replace the movable lower prisms 7, 16 and 17 of Figs. 1 to 6, for example, being actually a liquid cell generally indicated at 157. This cell has a glass or other transparent bottom 158 and transparent sides 159, 160 of glass or other material already mentioned herein, the sides and bottom being cemented or fused together. At their upper edges the sides do not actually meet, but are instead surmounted by upright wall members 161, 162 cemented or fused upon said sides and spaced apart a slight distance so as to leave a narrow space or slot 156 between them. Naturally, end members are intended to be cemented, fused or otherwise secured to the ends of the bottom, sides and upright wall members just described, and may be conventional, so long as the assemblage forms a proper cell to hold a liquid 163 which may be similar to liquid 98 in Fig. 10, if desired. A double face mirror 92 pendent from a cord 93 or the like is adapted to be lowered into the liquid within the cell or raised therefrom through slot 156 and will in lowered position reflect the light rays impinging on each side thereof, but when raised will allow the light from each side of the cell to pass freely through the liquid to the other side of said cell.

It is evident that the wall members 161, 162 may be extended upward a sufficient distance so that even in raised position, the mirror 92 will be protected upon both sides by said wall members. The upper prisms or prism systems, although not shown in Fig. 17, can of course be used with the cell as desired.

It is obvious that in any one of the modifications shown, lens systems similar to 44 and 45 may be introduced between the prisms as, for example, illustrated in Fig. 6, instead of using lenses similar to 23 as particularly shown in Figs. 1 and 2. It is also clear that prisms 7 and 113 which are split along half their length and provided with interior mirror coatings within the split portions, may also be split along their entire length and have merely half of the length of each interior surface provided with the mirror coatings.

In Figs. 18 and 19, the optical system follows the same general principles as disclosed in Figs. 1 and 2, but the means for shifting the lower prism means as well as the objective lenses are omitted for simplicity of illustration. The prisms 1, 2 and 7 of Figs. 1 and 2 are also replaced by a group, including two vestibule prisms 164, 165 and associated reflecting prisms 166, 167 separated from prisms 164, 165 by the plane surfaces 168, 169 which are disposed at angles ranging from about 36° to about 43° upon each side of the optical axis 178 when measuring said angles with respect to the aligned ends or bases 170, 170' of prisms 164, 165. The outer sides 171, 172 are preferably ground or roughened in order to eliminate stray reflections and absorb ghost images. Upon the meeting sides of prisms 166, 167 at 177, the light is prevented from passing from one to the other by a barrier preferably formed by roughening or grinding the adjacent surfaces which coincides with the axis 178. On the other hand, the outer sides 173, 174 serve to reflect light within the prisms and may be silver coated for this purpose, while the inner surfaces 175, 176 are similar to 10 and 11 in Fig. 1.

The lower prism 7 of said Fig. 1 is here replaced by an arrow head prism indicated at 179, having the lower branches 180, 181 with the outer surfaces 182, 183 parallel with inner surfaces 175, 176, respectively, of prisms 166, 167, while through part of its length, the prism is centrally divided along the axial plane by a double reflecting coating or means at 186, 187 as in the case of Figs. 1, 2 and 4 at 20, 21. Upon the outer sides 184, 185 roughening is also preferably resorted to, for preventing stray entry of light. For the same reason, a pair of additional vestibule prisms 188, 189 disposed within the outline of prism 179 have a mutual light barrier 190 in the axial plane, while at their outer sides they substantially meet the inner sides of prism 179 at angular planes 191, 192 which are disposed at an angle ranging from about 36° to about 43° upon both sides of the axis when measuring the angles from the aligned bases 193, 194, which in turn are parallel with upper bases 170, 170'.

The angles at which the separating planes 168, 169, 191, 192 are disposed will serve to prevent light rays from passing through the system if entering at a wrong angle too far to one side or upon the wrong side. In order to assist in trapping all such stray rays, the further prisms 195, 196, 197, 198 may be introduced into the spaces between prisms 166, 167 and prism 179. These additional prisms have parallel bases 201, 202 parallel with sides 175 and 182 of prisms 166 and 179 on the one hand, and parallel with sides 175 and 176 of prisms 179 and 167, respectively. The prisms 195 and 196 have a dividing plane 199, while prisms 197, 198 have a similar dividing plane 200 finally cutting off by reflection any undesired rays which may have passed the previous barriers or reflecting planes 191, 192, etc., while the outer sides 205 to 208 are roughened.

Thus, when a direct ray 209 enters base 194, it passes up through plane 192 to reflecting side 183 and thence is reflected through sides 182, 202 and dividing plane 199 and sides 175 and 201 to reflecting surfaces 173 and 175, up through dividing plane 168 to and out through upper base 170 of prism 164. A stray ray 210 entering at 194 meets dividing plane 192 within prism 189 and is reflected toward the central barrier 190 and is lost. Another ray 211 entering base 193 and passing dividing plane 191 also may enter prism 196, but is there stopped by reflecting plane 199 toward rough or non-reflecting side 206. Also, from the upper end of the system, it is not possible to view mirror sides 173 or 174 through bases 170, 170' nor to receive direct rays therefrom, but the attempted line of sight 212 simply meets reflecting plane 168 and is thrown out of non-reflecting side 171. The effectiveness of the various reflecting planes depends on their approximation toward the critical angle without actually coinciding therewith.

Figure 20:
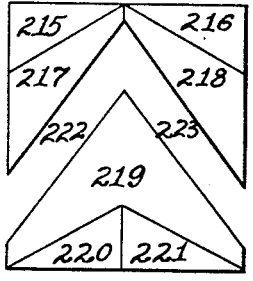
Fig. 20 is similar to Figs. 18 and 19, but replacing the central axial reflecting means with other facilities for reversal and erection of an image.

In Fig. 20, the main prisms are in outline exactly as in Figs. 18 and 19, and are provided with a lens or objective to show that the prism system in said two figures are thus normally equipped. Hence, in said Fig. 20, the prisms 215, 216, 217 and 218 may be in all particulars the same as prisms 164, 165, 166 and 167 respectively, of Figs. 18 and 19, while also the prisms 219, 220 and 221 may be like prisms 179, 188 and 189 of said Figs. 18 and 19 except for the absence of any central division of the arrowhead prism 219 such as found at 186, 187 in prism 179.

In each of the modifications of the present optical system as a whole the same principle holds true, namely, that a reflecting member which is either a bona fide mirror or a mirror coating upon a surface of a prism member is shiftable in a plane coinciding with the optical axis of the system, the direction of movement being immaterial, but in each case the mirror or mirror coating is at all times disposed and movable in the same plane which coincides with the optical axis, with the result that either the mirror alone or a prism containing the mirror coating is movable to produce reversal or rectification of the transmitted or projected image. In addition to the foregoing, it is also clear that the invention involves the idea of making room for the mirror or other operating parts along a plane coinciding with the axis of the optical system by splitting the light rays along said axis and diverting the same to the left or the right and allowing the light rays thus separated to be restored to parallelism with the axis and reflected to their destined points and again brought together to form a proper and complete image.

Manifestly, many similar and other variations may be resorted to, and parts and features may be used without others within the spirit of my invention; and I therefore reserve the right to any and all such modifications and the various uses for which the modifications shown may be employed.

Having now fully described my invention, I claim:

1. In a reversible optical system having a central axis, prism means including a plurality of triangular prisms of transparent material symmetrically arranged as a group with respect to said axis, each prism having a base portion capable of passing light and a side capable of reflecting light toward or from said base, and substantially plane reflecting means in said optical system movable in a plane coinciding with said axis from one position in said plane in which said reflecting means intercepts the optical field to another position in said plane so as to allow the light from prism means on one side of said axis to cross the axis and enter prism means on the other side of said axis in said system, said plane reflecting means when intercepting the optical field causing the light transmitted through the system upon one side of the axis to be reflected back from said reflecting means and axis into prism means upon the same side of the axis and be retained upon and within said same side of the axis throughout its entire path of travel in said optical system.

2. In a reversible optical system having a central axis, prism means including a plurality of triangular prisms of transparent material symmetrically arranged as a group with respect to said axis, each prism having a base portion capable of passing light and a side capable of reflecting light to or from said base portion, and substantially plane reflecting means in said optical system movable in a plane coinciding with said axis, from one position in said plane in which said reflecting means intercepts the optical field, to another position in said plane so as to allow the light from prism means on one side of said axis to cross the axis and enter prism means on the other side of said axis in said system, said plane reflecting means when intercepting the optical field causing the light transmitted through the system upon one side of the axis to be reflected back from said reflecting means and axis into prism means upon the same side of the axis and be retained upon and within said same side of said axis throughout its entire path of travel in said optical system, said reflecting means comprising a double faced mirror located and movable in a plane coinciding with the axis of said system, and one of the prisms of the system being split and capable of receiving said mirror in one position in which said mirror intercepts the optical field and allowing the mirror to be movable to another extreme position in which said mirror is out of range of the optical field of the system.

3. In a reversible optical system having a central axis, prism means including a plurality of triangular prisms of transparent material symmetrically arranged as a group with respect to said axis, each prism having a base portion capable of passing light and a side capable of reflecting light to or from said base portion, and substantially plane reflecting means in said optical system movable in a plane coinciding with said axis, from one position in said plane in which said reflecting means intercepts the optical field, to another position in said plane so as to allow the light from prism means on one side of said axis to cross the axis and enter prism means on the other side of said axis in said system, said plane reflecting means when intercepting the optical field causing the light transmitted through the system upon one side of the axis to be reflected back from said reflecting means and axis into prism means upon the same side of the axis and be retained upon and within said same side of said axis throughout its entire path of travel in said optical system, one of the prisms being provided interiorly along part of its length with reflecting means rigid therewith and disposed in a plane coinciding with the axis of said system, said prism being clear throughout another part of its length and longitudinally movable from a position in which said reflecting means within the same will serve to intercept the optical field, into another position wherein the other portion of said prism which is clear and free from interior reflecting means is disposed in the optical field, so that the light from one side of said prism freely cross said axis and pass to the other side of said prism.

4. In a reversible optical system having a central optical axis and a pair of rectangular triangular prisms disposed adjacent to each other with the ends thereof perpendicular to said optical axis and the outer sides of said prisms parallel with said axis, an equilateral triangular prism disposed with its base perpendicular to said axis and the two sides thereof parallel with and spaced from the inner sides of said rectangular prisms, the combination of mounting means allowing movement of said equilateral prism longitudinally with respect to said prism but perpendicularly with respect to said axis, and plane reflecting means within a portion of said equilateral prism located in a plane coinciding with said optical axis and movable wholly in the axial plane, into or out of the optical field on movement of said equilateral prism, so as to intercept and reflect light directed toward said axial plane at an angle thereto, the other portion of said equilateral prism being clear and allowing the light directed toward said axial plane to cross said plane.

5. In a reversible optical system having a central axis, prism means including a plurality of triangular prisms of transparent material symmetrically arranged as a group with respect to said axis, each prism having a base portion capable of passing light and a side capable of reflecting light to or from said base portion, and substantially plane reflecting means in said optical system movable in a plane coinciding with said axis, from one position in said plane in which said reflecting means intercepts the optical field, to another position in said plane so as to allow the light from prism means on one side of said axis to cross the axis and enter prism means on the other side of said axis in said system, said plane reflecting means when intercepting the optical field causing the light transmitted through the system upon one side of the axis to be reflected back from said reflecting means and axis into prism means upon the same side of the axis and be retained upon and within said same side of said axis throughout its entire path of travel in said optical system, having a central trough formed between two prism means in a plane coinciding with the optical axis, said trough being capable of holding a transparent liquid, substantially plane reflecting means in the system consisting of a mirror, and means for shifting said mirror into the optical field in said trough and also shifting said mirror from said position out of range of the optical field.

6. In a reversible optical system having a central axis and a pair of rectangular prisms having portions thereof disposed mutually adjacent with the ends substantially in line and the outer sides practically in parallelism with the axis, additional prism means symmetrically disposed with respect to said axis and projecting between said rectangular prisms and having sides disposed in spaced parallelism with respect to the inner sides of said rectangular prisms, and shiftable plane reflecting means located in a plane coinciding with said axis and capable of being moved wholly in said plane from one position in which said reflecting means is located in the optical field to another position out of range of said field.

7. A reversible optical system having a central axis and prism means symmetrically disposed with respect to said axis, said prism means having an end portion perpendicular with respect to said axis and outer sides parallel with the same, while having interior surface portions disposed at acute angles with respect to said outer sides and meeting at an angle of less than 180° disposed upon said axis but spaced within said end portion, additional prism means symmetrically disposed with respect to said axis having two sides thereof disposed in spaced parallelism with respect to the inner sides of said first prism means, and substantially plane reflecting means located in a plane coinciding with said axis and movable from one extreme position in said plane wherein said reflecting means intercepts the optical field to another extreme position in said plane out of range of said optical field.

8. A reversible optical system according to claim 7, wherein the second or additional prism means comprises an equilateral prism which interiorly contains the reflecting means in the form of interior mirror coatings extending through part of the length of said prism, said prism being itself longitudinally movable in order to move said reflecting means from one extreme position to the other.

9. A reversible optical system according to claim 7, wherein the second prism means comprises a prism having two sides disposed in spaced parallelism with respect to the inner sides of the first prism means, said two sides of said prism terminating in a ridge perpendicular to the axis of the system, said prism also having two other sides terminating in a second ridge also disposed perpendicularly to said axis, and a further prism means having a generally flat base perpendicular to the mentioned axis, and two inner sides upon said last prism means inclined from the outer edges of said prism in concave manner toward the base so as to meet in a groove perpendicular to the optical axis.

10. In a reversible optical system having a central axis, the combination of a pair of rectangular prisms disposed mutually adjacent to each other, said prisms having flat end portions in line and perpendicular to said axis, and outer sides in parallelism therewith, the inner sides of said prisms forming acute angles with said flat ends and with said outer sides, intermediate prism means comprising a symmetrical pair of prisms each having a side disposed in spaced parallelism with one of the inner sides of said first prism, a second pair of sides upon said symmetrical pair of prisms which are inclined with respect to said axis, said intermediate or symmetrical pair of prisms also having their longest sides disposed adjacent to and in parallelism with said axis, a further prism means comprising a pair of prisms having flat ends disposed in line and perpendicular to said optical axis, and inner sides upon said last pair of prisms parallel with and spaced from said second pair of sides upon said intermediate or symmetrical pair of prisms, and mirror means movable between the two adjacent sides of said intermediate or symmetrical pair of prisms from one extreme position in which said mirror means intercepts the optical field to another extreme position out of range of said optical field.

11. An optical system according to claim 10, wherein portions of the intermediate or symmetrical pair of prisms are secured together between limited portions of the adjacent parallel sides of said prisms forming a rigid couple having a slotted portion between the same adapted to receive the movable mirror means in one position thereof.

12. A reversible optical system comprising in combination, a main prism having a cross section, as seen in a plane extending parallel to the longitudinal axis of the system, in the form of an equilateral triangular prism having a base thereof disposed perpendicularly to said axis and having the apex opposite said base disposed on said axis, double-sided reflecting means contained within a portion of said prism extending from the base to the apex in a plane which is at least parallel with said axis, the other portion of said triangular prism being clear, and two mutually adjacent prisms having surface portions disposed respectively parallel to the sides of said triangular prism on opposite sides of said apex, and said prisms having contiguous ends and cross sections parallel to that of the first prism, in the form of right-angled triangular prisms whose hypotenuses lie in said surface portions, and said first named prism being movable longitudinally with respect to its own length in a direction perpendicular to said axis from one extreme position in said plane in which the clear portion of said prism is in operative relation with respect to the other two prisms so as to pass light directed toward said plane through the latter, to another extreme position in the same plane in which the portion containing said reflecting means is disposed in operative relation with respect to said other two prisms so as to intercept and reflect light directed toward said plane.

13. A reversible optical system comprising in combination, a main prism having a cross section, as seen in a plane extending parallel to the longitudinal axis of the system, in the form of an isosceles triangular prism having a base thereof disposed perpendicularly to said axis and having the apex which is opposite said base disposed on said axis, reflecting means contained within a portion of said prism extending from the base to the apex in a plane coinciding with said axis, the other portion of said triangular prism being clear, and two mutually adjacent prisms having surface portions disposed respectively parallel to the equal sides of said triangular prism on opposite sides of said apex, said prisms having contiguous ends, and cross sections parallel to that of the first prism, in the form of two triangular prisms whose hypotenuses lie in said surface portions with bases parallel to the base of said isosceles triangular prism and disposed contiguously and in line with each other, and said first named prism being movable longitudinally with respect to its own length in a direction perpendicular to said axis from one extreme position in said plane in which said clear portion of said prism is in operative relation with respect to the other two prisms, so as to pass light directed toward said plane through the latter, to another extreme position in the same plane in which the portion containing said reflecting means is disposed in operative relation with respect to said other two prisms, so as to intercept and reflect light directed toward said plane.

14. A reversible optical system comprising, in combination, a pair of contiguous prisms having parallel outer sides and contiguous outer ends, and inclined inner surface portions terminating upon the longitudinal axis of the system in a concave apex, additional prism means having two outer sides spaced from said inner surface portions of the first prisms in parallelism with the same inner surface portions, reflecting means disposed in a plane coinciding with said optical axis and making equal angles with said outer sides of said additional prism means, and supporting means allowing said reflecting means to be movable in said plane which coincides with said axis.

15. A reversible optical system comprising in combination, a pair of contiguous prisms having parallel outer sides and contiguous outer ends, and inclined inner surface portions terminating upon the longitudinal axis of the system in a concave apex, additional prism means having two outer sides spaced from said inner surface portions of the first prisms in parallelism with the same inner surface portions, reflecting means disposed in a plane coinciding with said optical axis and making equal angles with said outer sides of said additional prism means, supporting means allowing said reflecting means to be movable in said plane which coincides with said axis, and further prism means having contiguous ends meeting upon the optical axis of the system and having inner surface portions spaced from and facing the ends of said additional prism means in parallelism with said ends, the contiguous ends of said further prism means being parallel with the outer contiguous ends of said first prisms.

16. In an optical system having an optical axis and a pair of rectangular triangular prisms arranged with the ends thereof contiguous and perpendicular to said axis and the outer sides of said prisms parallel with the axis, the features comprising additional triangular prism means symmetrically disposed with respect to said axis and projecting between said rectangular prisms with two outer sides disposed in parallelism with the inner sides of the rectangular prisms, there being a clearance space between corresponding portions of said additional prism means along a plane coinciding with said optical axis, shiftable reflecting means capable of being located in said clearance space and of intercepting the light directed toward said plane in the optical field in both sides of said optical system and of reflecting said light so as to retain the same within the confines of each said side of the optical axis in said system and preventing said light from crossing said optical axis, and means for supporting and guiding said shiftable reflecting means in movement, said reflecting means being also shiftable wholly in said plane from said clearance space to another position in the same plane in which the light in one side of said system will freely pass across said axis to the other side within said additional prism means.

17. A reversible optical system comprising in combination, a pair of spaced prisms having parallel outer sides and symmetrical outer ends, and inclined inner surface portions upon the prisms, additional prism means having two outer sides spaced from said inner surface portions of the first prisms in parallelism with the same inner surface portions, reflecting means disposed in a plane coinciding with the axis and making equal angles with said outer sides of said additional prism means, supporting means allowing said reflecting means to be movable in said plane which coincides with said axis, a pair of contiguous symmetrical prisms having their surface portions meeting upon the axis of said system and having inner inclined surface portions parallel with and spaced from the ends of said additional prism means.

18. A reversible optical system according to claim 6, wherein the shiftable plane reflecting means comprises a movable mirror, and the additional prism means is slotted along the plane which coincides with the optical axis and also has means connecting portions of said additional prism means so as to form a trough in which said mirror is shiftable from one position in which it intercepts the light rays in the optical field, to another position in which said mirror is out of range of the optical field of the system, and wherein the trough is adapted to hold a fluid capable of transmitting light.

19. A reversible optical system according to claim 6, wherein the shiftable plane reflecting means comprises a movable mirror, and the additional prism means is slotted along the plane which coincides with the optical axis, and also has means connecting portions of said additional prism means so as to form a trough therebetween which projects out of the optical field at one end, and in which trough said mirror is shiftable from one position in which it intercepts the light rays in the optical field, to another position in which said mirror is out of range of the optical field of the system, and wherein the trough is adapted to hold a fluid capable of transmitting light.

20. A reversible optical system having a longitudinal optical axis and comprising a composite prism having an end portion disposed at right angles with respect to the longitudinal axis of the system, and having outer sides parallel with said axis and also inner sides inclined at an angle with respect to said outer sides toward said end portion and terminating upon the axis in a concave apex, additional prism means having a clear portion, there being two sides of said additional prism means spaced from and parallel with the inner inclined sides of said composite prism, reflecting means disposed in a plane coinciding with said optical axis, and supporting means allowing said reflecting means to be movable in said plane from a position in which said reflecting means intercepts the light in the optical field of the system, to another position in which said reflecting means is removed from the path of the light in the optical field so as to expose a clear portion of the additional prism means which will transmit said light in said optical field.

21. A reversible optical system having a central axis and comprising a pair of similar but opposite prisms symmetrically arranged with respect to said axis and having optically inactive outer sides and aligned outer ends, said prisms having inclined inner sides disposed at angles with respect to said axis ranging from about 36° to about 43°, a second pair of symmetrically arranged prisms having parallel reflecting outer sides, and inclined inner sides making substantially 30° angles with said axis and further having ends closely parallel to the inner sides of the first prisms, a third pair of prisms having bases parallel with the aligned outer ends of said first prisms and having outer sides disposed at angles ranging from about 36° to about 43° with respect to said optical axis and also inner adjacent sides which substantially coincide with, or are at least parallel to, said axis and optically inactive, and an arrow head prism having two inner inclined sides forming a hollow apex bisected by said axis and lying closely parallel to the outer sides of the third pair of prisms, and outer inclined sides upon said arrow head prism spaced from but parallel with the inner inclined sides of said second pair of prisms, the bases of said third pair of prisms each being capable of passing light rays therethrough up to and through one of the inner inclined sides of the arrow head prism and to the corresponding outer inclined side of the latter, thence across the optical axis within said arrow head prism to the other outer inclined side of the same, the light rays passing out through the last mentioned outer inclined side proceeding toward and through the inner inclined side of one prism of the second pair of prisms to the outer reflecting side of the same, thence back to the same inner inclined side at a reflecting angle and from said inclined side through the end of the same prism, in through the inner inclined side of the corresponding prism of the first mentioned pair, and finally out through the end thereof, said prisms effectively cooperating to prevent passage of light rays therethrough which impinge at an inclined angle on the bases of the third pair of prisms or on the ends of the first pair.

22. An optical system according to claim 21, having means for neutralizing or reversing the optical reversing effect of said system so as to cause an image ordinarily reversed by the system to be restored and normally projected instead, said means including reflecting means disposed within a portion of the arrow head prism in a plane coinciding with the optical axis and the arrow head prism being shiftable to a position in which said reflecting means is disposed in the path of the light rays passing from one outer inclined side toward the other in said prism so as to return said rays to the same side of said arrow head prism and cause the rays to continue on through the individual prisms of the first and second pairs and the half of said arrow head prism located on the same or corresponding side of the optical axis as said one outer inclined side of the arrow head prism from which the rays were reflected toward said reflecting means.

CARL F. WM. FORSSBERG.